United States Patent
Yoshizaki

[11] 3,840,885
[45] Oct. 8, 1974

[54] ELECTRONICALLY CONTROLLED SHUTTER MECHANISM FOR A CAMERA

[75] Inventor: Akira Yoshizaki, Osaka, Japan

[73] Assignee: Minolta Camera Kabushiki Kaisha, Osaka, Japan

[22] Filed: Oct. 26, 1973

[21] Appl. No.: 409,847

[30] Foreign Application Priority Data
Nov. 1, 1972 Japan.............................. 47-110053

[52] U.S. Cl.................. 354/251, 354/252, 354/258, 354/267
[51] Int. Cl........ G03b 9/10, G03b 9/14, G03b 9/58
[58] Field of Search .......... 354/250, 251, 252, 256, 354/258, 48, 50, 51, 53, 267

[56] References Cited
UNITED STATES PATENTS

| | | | |
|---|---|---|---|
| 3,208,365 | 9/1965 | Cogren, Jr. et al................ | 95/10 CT |
| 3,362,309 | 1/1968 | Cogren, Jr. et al................ | 95/10 CE |
| 3,398,668 | 8/1968 | Sharp................................ | 95/10 CT |
| 3,545,352 | 12/1970 | Bellows............................ | 354/51 |
| 3,645,186 | 2/1972 | Kitai ................................ | 354/258 X |
| 3,646,870 | 3/1972 | Koleff et al. .................... | 354/252 |
| 3,720,152 | 3/1973 | Uchiyama et al................ | 354/258 X |
| 3,722,392 | 3/1973 | Kitai ................................ | 354/258 X |

Primary Examiner—Joseph F. Peters, Jr.
Attorney, Agent, or Firm—Wolder & Gross

[57] ABSTRACT

One of an electromagnet operable under the control of an exposure time control electric circuit and an attractable piece attractable and holdable to the electromagnet upon energization thereof is fixedly mounted on a shutter sector supported by a fixed member away from a shutter opening. The other of these two members is supported by a shutter operating member biased in a shutter opening direction and retainable in its cocked position upon shutter cocking action. Subject to the energization of the electromagnet, the operating member moves along with the sector upon shutter tripping action to open the shutter and permits the sector to close the shutter. The operating member is braked to slow down its shutter opening movement, whereby the diaphragm aperture size and shutter speed can be determined in accordance with the brightness of subject in programmed manner. The shutter further includes means for preventing the shutter sector from bounding when it comes to a halt at the final stages of shutter opening and closing movements, the bound preventing means having indicators for visibly indicating that the shutter has not been cocked and that the power source battery has been exhausted, respectively.

7 Claims, 6 Drawing Figures

ELECTRONICALLY CONTROLLED SHUTTER MECHANISM FOR A CAMERA

BACKGROUND OF THE INVENTION

The present invention relates to electronic shutters for cameras, more particularly to an electronic shutter employing an electromagnet to be energized and deenergized under the control of an exposure time control electric circuit so that the shutter is opened upon shutter tripping action subject to energization of the electromagnet and is closed upon deenergization of the electromagnet.

With conventional cameras including an electronic shutter which is adapted to be opened and closed by only one shutter operating member, the operating member must be latched in the course of rapid movement by a latch member operable under the control of an electromagnet when it is necessary to temporarily hold the shutter fully opened during shutter opening and closing operation to make an exposure.

Accordingly, the moment when the operating member comes into engagement with the latch member, the rapidly moving operating member exerts an intense impactive force on the latch member and the force thus applied directly affects the magnetic attracting force of the electromagnet, so that there is a need to use an electromagnet giving a strong magnetic force, this entailing the drawback of causing a marked consumption of power source energy. Furthermore sufficient consideration must be given to the strength of the operation members.

To initiate the shutter into closing action, the latch member releases the operating member under the action of the electromagnet, but the unlatching operation involves a mechanical delayed action, making it very difficult to obtain an accurate shutter speed.

SUMMARY OF THE INVENTION

An object of this invention is to provide an electronic shutter in which an electromagnet to be energized under the control of an exposure time control electric circuit is adapted to be driven in one direction upon shutter tripping action, thereby causing a shutter sector to be moved directly by the electromagnet, so as to reduce the number of parts incorporated in the shutter mechanism and to simplify the mechanism.

Another object of this invention is to eliminate an impactive reaction to be exerted on the magnetic attracting force of the electromagnet when the shutter sector is brought to a halt at the position where the shutter is fully opened.

Another object of this invention is to eliminate any mechanical delay in shutter closing action to thereby provide an electronic shutter which is inexpensive and operable accurately.

Another object of this invention is to provide an electronic shutter incorporating therein means for braking the shutter opening operation so that the diaphragm aperture size and shutter speed can be determined in accordance with the brightness of subject.

Another object of this invention is to provide means for braking the shutter opening and closing operations respectively at the almost final stages of the operations to completely prevent the shutter elements from bounding when they are brought to a halt.

Another object of this invention is to provide means for visibly indicating that the shutter has been opened and closed.

Still another object of this invention is to provide simple means for visibly indicating and warning that the power source battery has run down.

According to this invention, a shutter sector biased in the shutter closing direction and a shutter operating member biased in the shutter opening direction are movably supported by a fixed member mounted in position away from the shutter opening. One of an electromagnet to be energized and deenergized under the control of an exposure time control electric circuit and an attractable piece to be magnetically held attracted to the electromagnet when the magnet is energized is mounted on one of the sector and the operating member, the other of the former two members being mounted on the other of the latter two members.

When the electromagnet is energized upon shutter tripping action and the shutter operating member is subsequently driven by the biasing force, the electromagnet and attractable piece cause the shutter sector to move with the operating member to open the shutter. Upon deenergization of the electromagnet, the shutter sector travels in the opposite direction to close the shutter under the action of the biasing force applied thereto.

The shutter is fully opened by virtue of the entire course of travel of the shutter operating member. During the shutter closing operation, the operating member remains in its stopped position, permitting the shutter sector to travel alone. Accordingly, the present shutter mechanism is greatly reduced in the number of the components and is therefore extremely simplified in construction.

The moment when the shutter sector stops at the position where the shutter is fully opened, the shutter operating member has already completed the whole course of its travel, there being no necessity to latch the operating member in the course of travel. The construction in which the electromagnet is adapted to accompany the shutter operating member renders the attracting force of the electromagnet free from an impactive counteracting force, with the result that the current for energizing the electromagnet can be reduced to a minimum required to cause the sector to follow the operating member against the biasing force acting on the sector. Thus power consumption will be minimized, rendering the battery serviceable for a prolonged period of time.

Inasmuch as the shutter sector is designed to be held, at the position where the shutter is fully opened, directly by the magnetic attracting force of the electromagnet alone, the biasing force acting on the sector initiates the sector into shutter closing movement immediately upon deenergization of the electromagnet without permitting any mechanical delayed action to take place, hence very accurate operation.

If a governor or like braking means is provided for the shutter opening movement of the shutter operating member, the shutter aperture will progressively enlarge to serve also as a diaphragm, making it possible to give an amount of exposure corresponding to the brightness of subject even before the shutter is opened out to a full extent. The electromagnet will then be deenergized to close the shutter. Thus the shutter operates as a so-called programmed electronic shutter such that the diaphragm aperture size and shutter speed are previously determined in programmed manner in accordance with the brightness of subject.

Furthermore, the present invention provides an opening bound preventing member which is adapted to engage and to thereby brake the shutter operating member at the almost final stage of its shutter opening movement to prevent the operating member from bounding when it comes to a halt, and a closing bound preventing member which is designed to engage and to thereby brake the shutter sector at the almost final stage of its shutter closing movement, thus preventing the sector from bounding when it stops. These members serve to eliminate the possibility that the shutter opening will be closed again due to the bounds taking place when the sector and the operating member come to a halt. In this way they allow the shutter to make exposures with improved accuracy.

The bound preventing members have indicating portions respectively which are movable, for example, into or out of the finder field. The closing bound preventing member is movable in operative relation to the shutter opening movement to bring the indicating portion thereof into the finder field, the indicating portion being retractable from the field in operative relation to the shutter closing movement. The opening bound preventing member is movable with the shutter operating member at the almost final stage of the shutter opening movement, thereby advancing the indicating portion thereof into the finder field. This indicating portion is removed from the finder field in operative relation to the movement of the operating member when it is restored to its cocked position by shutter cocking action.

Thus the indicating portions visibly indicate the initiation of exposure making operation, completion of exposure and the state of uncocked shutter. The absence of both the indicating portions in the finder field notifies that the shutter has completely been cocked.

The construction described further includes an alarm indicating member which is movable following the movement of the closing bound preventing member. If the power source battery for the electromagnet has been exhausted, this member gives a visible alarm upon shutter tripping action. When moving as above, the alarm indicating member has its indicating portion positioned into and out of the path of movement of the opening bound preventing member. When the shutter fails to open due to the exhaustion of power source battery in spite of shutter tripping action, the alarm indicating member moves with the opening bound preventing member to bring the indicating portion, for example, into the finder field.

Other objects and features of this invention will become more apparent from the description of embodiments given below.

DESCRIPTION OF THE PREFERRED EMBODIMENTS

Figure 1:
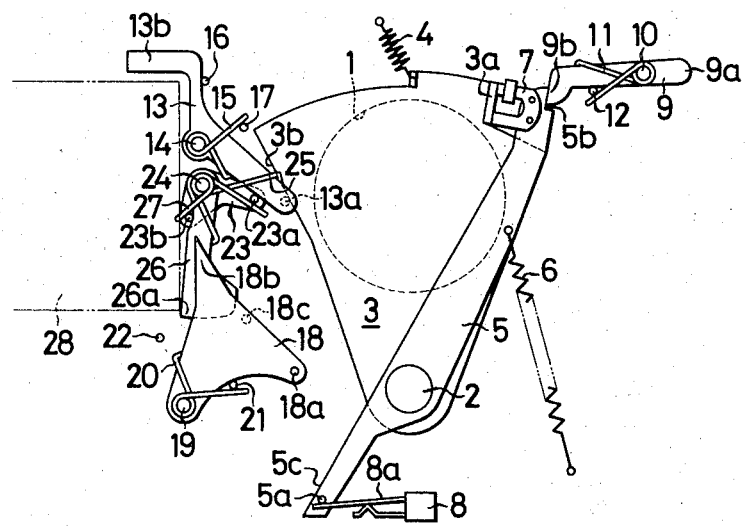
FIG. 1 is a front view showing the principal part of an embodiment of this invention as the shutter is in cocked position.
Figure 2:
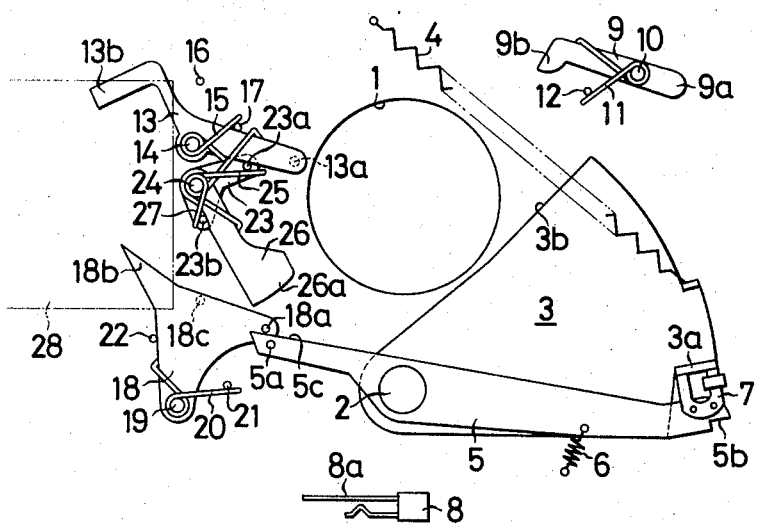
FIG. 2 is a view showing the same as the shutter is in full-open position.

With reference to FIGS. 1 to 4, a shutter base plate is formed with a shutter opening 1. A pivot 2, a fixed member, is disposed below the opening 1 and pivotally supports a shutter sector 3 which is biased in a counterclockwise direction by a shutter closing spring 4 to normally keep the shutter opening 1 closed.

Also pivotally supported on the pivot 2 is a shutter operating member 5 which is biased in a clockwise direction by a shutter opening spring 6 that is stronger than the spring 4. The shutter operating member 5 is fixedly provided, at its front end, with an electromagnet 7. When the shutter is in cocked position, the attracting surface of the electromagnet 7 is mechanically held in intimate contact with or in proximity to an attractable piece 3a fixed to the sector 3. The operating member 5 has at its rear end a pin 5a which, when the shutter is in its cocked position, is in pressing contact with the movable contact member 8a of a counting switch 8 to keep the switch 8 closed.

The operating member 5 is further formed, in its front end, with a stepped portion 5b which is brought into engagement with the front end 9b of a latch member 9, whereby the member 5 is latched in its cocked position.

The latch member 9, pivotally supported by a pin 10 on the shutter base plate, is biased by a spring 11 in a counterclockwise direction into contact with a stopper 12 and has a rear end 9a positioned in the path of advance of an unillustrated release member. Upon shutter tripping action, the release member depresses the rear end 9a to turn the latch member 9 in a clockwise direction and to thereby unlatches the shutter operating member 5.

A closing bound preventing member 13, pivotally supported by a pin 14 on the shutter base plate, is urged in a counterclockwise direction by a spring 15 weaker than the shutter closing spring 4. While the shutter is in closed position, a pin 13a on the rear end of the member 13 is engaged by the side edge 3b of the shutter sector 3, whereby the member 13 is held turned in a clockwise direction against the spring 15. The member 13 bears against a stopper 16 and is thereby stopped. Thus, by way of the closing bound preventing member 13, the stopper 16 serves as a member to determine the position of the shutter sector 3 when closing the shutter opening 1. A stopper 17 is provided to limit the counterclockwise turning of the closing bound preventing member 13 to be described later.

An opening bound preventing member 18 is pivotally supported by a pin 19 on the shutter base plate and is biased in a clockwise direction into contact with a stopper 21 by a spring 20 which is weaker than the shutter opening spring 6. In this position, a pin 18a on the member 18 is located in the path of movement of the rear end 5c of the shutter operating member 5.

A stopper 22 is provided to limit the amount of movement of the member 18 when the member 18 is turned in a counterclockwise direction by the shutter opening movement of the shutter operating member 5.

Since the opening bound preventing member 18 is turned by the shutter operating member 5, the stopper 22 serves to determine the positions of the operating member 5 and the shutter sector 3 when the shutter is opened out fully.

An intermediate member 23 is pivotally supported by a pin 24 on the shutter base plate and is urged by a spring 25 in a counterclockwise direction. The spring 25 has a coiled portion supported on the pin 24, one end in engagement with a pin 23a on the intermediate member 23 and the other end in engagement with the closing bound preventing member 13, the pin 23a thus being held in contact with one edge of the closing bound preventing member 13.

Further pivoted to the pin 24 is an alarm indicating member 26 biased in a clockwise direction by a spring 27 which has a coiled portion supported on the pin 24, one end in engagement with a pin 23b on the intermediate member 23 and the other end engaging one edge of the member 26. Thus, the spring brings the other edge of the member 26 into contact with the pin 23b. The two springs 25 and 27 and the intermediate member 23 therefore render the alarm indicating member 26 movable with the closing bound preventing member 13.

The closing bound preventing member 13, opening bound preventing member 18 and the alarm indicating member 26 have indicating portions 13b, 18b and 26b, respectively, which are movable, for example, into and out of a finder field 28 in the manner to be described later to provide visible particular indications respectively.

The opening bound preventing member 18 is further provided on its rear surface with a pin 18c which is engageable with the indicating portion 26a of the alarm indicating member 26 when so desired, depending on the shifting of the member 26 relative thereto caused by the movement to be described later, so as to bring the indicating portion 26a into the finder field 28.

With reference to FIG. 1 showing the shutter in it cocked position, an unillustrated shutter button is depressed to bring down an unillustrated release member, which in turn closes the power source switch of a generally well-known exposure time control electric circuit (not shown) to energize the electromagnet 7. The electromagnet 7 attracts the attractable piece 3a of the shutter sector 3 electromagnetically.

Further depression of the release member pushes the rear end 9a of the latch member 9, turning the member 9 in a clockwise direction to release the shutter operating member 5 from its front end 9b and to thereby free the same from its cocked position. Consequently, the operating member 5 turns clockwise under the action of the shutter opening spring 6, causing the electromagnet 7 and the attractable piece 3a held attracted thereto to move the shutter sector 3 in a clockwise direction against the spring 4 to open the shutter opening 1.

Simultaneously with the clockwise turning of the operating member 5, the member 5 frees the movable contact member 8a of the counting switch 8 from the pressure of the pin 5a, permitting the contact member 8a to open the switch 8 with its elastic restoring force. This initiates the exposure time control electric circuit into exposure time measuring operation.

With the clockwise movement of the shutter sector 3, the closing bound preventing member 13 which has been retained in the position of FIG. 1 by the sector 3 turns counterclockwise under the action of the spring 15, bringing the indicating portion 13b into the finder field 28 to visibly indicate that the shutter has been opened. The member 13 is stopped by the stopper 17.

The movement of the closing bound preventing member 13 causes the spring 25 and pin 23a to move the intermediate member 23 with the member 13 in a counterclockwise direction. The intermediate member 23 in turn moves therewith the alarm indicating member 26 in a counterclockwise direction by means of the pin 23b. Thus, with the counterclockwise turning of the closing bound preventing member 13, the alarm indicating member 26 also turns in the same direction and removes the indicating portion 26a thereof from the path of movement of the pin 18c during the counterclockwise turning of the opening bound preventing member 18.

At the almost final stage of clockwise movement of the shutter operating member 5, namely at a position slightly before it completes the clockwise movement, the rear end 5c of the member 5 comes into contact with the pin 18a on the opening bound preventing member 18 and turns the member 18 counterclockwise against the spring 20 thereon. During this movement, the spring 20 acts against the rotational torque of the shutter operating member 5 which is turning clockwise rapidly under the action of the spring 6, thereby slowing down the motion of the member 5 to prevent impactive stopping action thereof. The counterclockwise movement of the opening bound preventing member 18 is completed by the contact of the member 18 with the stopper 22. At the same time, this stops the clockwise movements of the member 5 and the sector 3. In this way the biasing force of the spring 20 which counteracts the rotational torque of the shutter operating member 5, turning under the action of the spring 6, completely prevents the member from bounding when it comes to a halt. The stopper 22 determines the position of the shutter sector 3 where the shutter is fully opened out. In addition, the opening bound preventing member 18 now positions the indicating portion 18b thereof within the finder field 28. The parts therefore assume the positions of FIG. 2. The indicating portion 18b remains within the finder field 28 even after the shutter is closed by the operation to be described later. It is retracted from the field 28 by shutter cocking action. Accordingly, the indicating portion 18b serves to visibly indicate that, after the exposure making operation, the shutter has not been cocked yet for the next photographing operation.

Upon completion of the time measuring operation by the exposure time control electric circuit with the shutter in its opened position, supply of energizing current to the electromagnet 7 is discontinued to deenergize the electromagnet 7, whereupon the shutter sector 3 turns rapidly in a counterclockwise direction to close the shutter opening 1 under the action of the spring 4. At the final stage of this movement of the shutter sector 3, the side edge 3b of the sector 3 comes into contact with the pin 13a on the closing bound preventing member 13 and turns the member 13 clockwise against the action of the spring 15, bringing out the indicating portion 13b thereof from the finder field 28. The contact of the member 13 with the stopper 16 completes the clockwise movement of the member 13 and the counterclockwise turning of the shutter sector 3. The spring 15 acting on the preventing member 13 counteracts the rotational torque of the shutter sector 3 rapidly turning under the action of the spring 4 and brakes the sector 3 to a stop, thus preventing the sector 3 from bounding when the sector 3 is brought to a halt.

The clockwise turning of the closing bound preventing member 13 pushes the pin 23a on the intermediate member 23 with its one edge and turns the member 23 clockwise. Consequently, the alarm indicating member 26 which is operatively connected to the member 23 by the spring 27 tends to turn in a clockwise direction. However, since one edge of the indicating portion 26a of the member 26 abuts against the pin 18c on the opening bound preventing member 18 which is held stopped by the stopper 22, the member 26 is prevented from clockwise turning. The exposure making operation is completed with the parts positioned as illustrated in FIG. 3.

Figure 3:
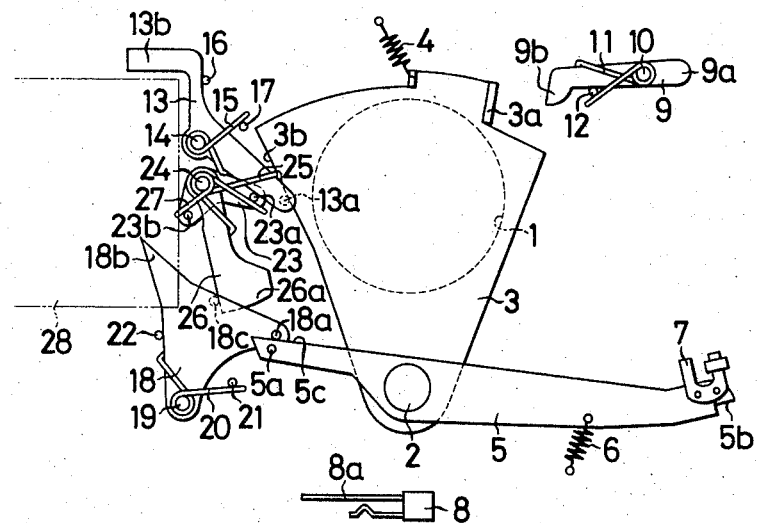
FIG. 3 is a view showing the same as the shutter is in closed position.

The shutter as positioned in the state of FIG. 3 is cocked by operating an unillustrated cocking member, which turns the shutter operating member 5 in a counterclockwise direction while tensioning the spring 6. At the final stage of this movement, the pin 5a pushes the movable contact member 8a of the counting switch 8. The member 5 further brings the attracting surface of the electromagnet 7 into pressing contact with or proximity to the attractable piece 3a of the shutter sector 3. The front end 9b of the latch member 9 biased in a counterclockwise direction comes into engagement with the stepped portion 5b of the shutter operating member 5 thus positioned. The member 5 is therefore latched in its cocked position.

The counterclockwise turning of the shutter operating member 5 frees, at the initial stage thereof, the opening bound preventing member 18 from the pressure of the member 5 and permits the member 18 to turn in a clockwise direction under the action of the spring 20, following the member 5, with the result that the indicating portion 18b is retracted from the finder field 28 to indicate that the shutter is in its cocked position. The member 18 stops upon contact with the stopper 21. During this movement, the pin 18c on the member 18 removes the indicating portion 26a from the path of the pin 18c while turning the alarm indicating member 26 counterclockwise against the spring 27 and moves past the indicating portion 26a thereunder, whereupon the alarm indicating member 26 turns in a clockwise direction under the action of the spring 27 and is then stopped by the contact of the edge thereof with the pin 23b on intermediate member 23. At this stopped position, the indicating portion 26a is located outside the finder field 28. The parts are now in the positions of FIG. 1 wherein the shutter is in its cocked state.

When the power source battery has run down and fails to supply sufficient current to energize the electromagnet 7, the electromagnet can no longer exert an attracting force on the attractable piece 3a sufficient to hold the piece and to turn the sector 3 in a clockwise direction against the action of the spring 4, even if the shutter button of the cocked shutter is depressed to close the power source switch.

If the shutter is tripped in such state, the shutter closing spring 4 continues to retain the sector 3 against clockwise movement, so that only the shutter operating member 5, set free from its cocked position, turns clockwise.

Figure 4:
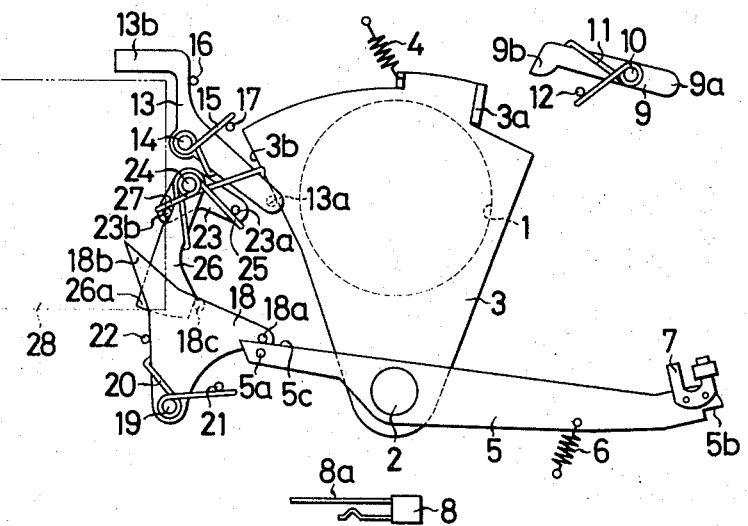
FIG. 4 is a view showing the same as the shutter remains inoperable in spite of shutter tripping action.

The member 5 turns the opening bound preventing member 18 in a counterclockwise direction at the final stage of its turning motion. The preventing member 18 in turn pushes the indicating portion 26a with its pin 18c and pivotally moves the indicating member 26 in a clockwise direction along with the intermediate member 23 against the spring 25 to advance the indicating portion 26a into the finder field 28 as shown in FIG. 4. This indicates that the power source battery has been exhausted and that the shutter is therefore inoperable.

Insofar as the battery has a sufficient power to energize the electromagnet 7, the shutter will be opened upon shutter tripping action and, at the same time, the closing bound preventing member 13, intermediate member 23 and alarm indicating member 26 will turn counterclockwise, permitting the indicating portion 26a to be removed from the path of movement of the pin 18c on the opening bound preventing member 18. However, in the case where the power source battery has run down, allowing the shutter operating member 5 only to turn clockwise, the members 13, 23 and 26 which are movable with the shutter sector 3 remain stationary against pivotal movement, with the indicating portion 26a located in the path of movement of the pin 18c. As a result, an alarm is given as stated above.

In the event that such alarm indication is made, the power source battery for the electromagnet need be replaced by a fresh one and the shutter may then be cocked again. However, with cameras in which the film is adapted to be wound up by shutter cocking operation, the double exposure making member may be manipulated to effect shutter cocking action alone or the means for preventing inadvertant exposure may be operated to render the shutter ready for cocking action, followed by film winding operation.

The fixed pivot 2 can be made serviceable as a connector for connecting the electromagnet 7 to the unillustrated exposure time control electric circuit and power source battery. To establish reliable electrical connection for this purpose, the shutter operating member 5 fixedly carrying the electromagnet 7 is electrically connected to the energizing winding of the magnet 7; and an unillustrated slidable contact member is provided which has one end fixedly mounted on the member 5 and the other end held in elastic pressing contact with the center of rotation of the fixed pivot 2.

The alarm may alternatively be given by employing an electric circuit which is capable of electrically furnishing an alarm, the arrangement being such that the switch of the circuit is adapted to be changed-over by the shifting of the members 13, 23 and 26.

Figure 5:
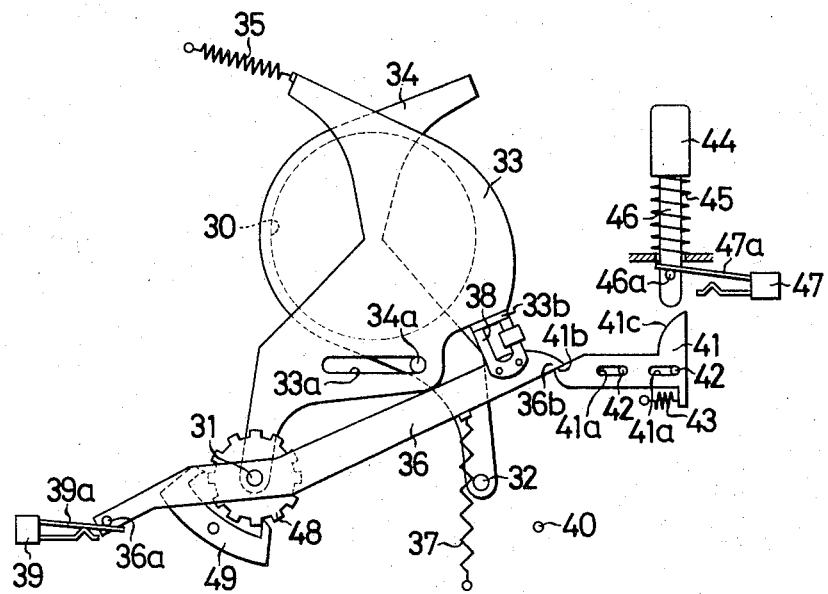
FIG. 5 is a front view showing the principal part of another embodiment of this invention as the shutter is in cocked position.
Figure 6:
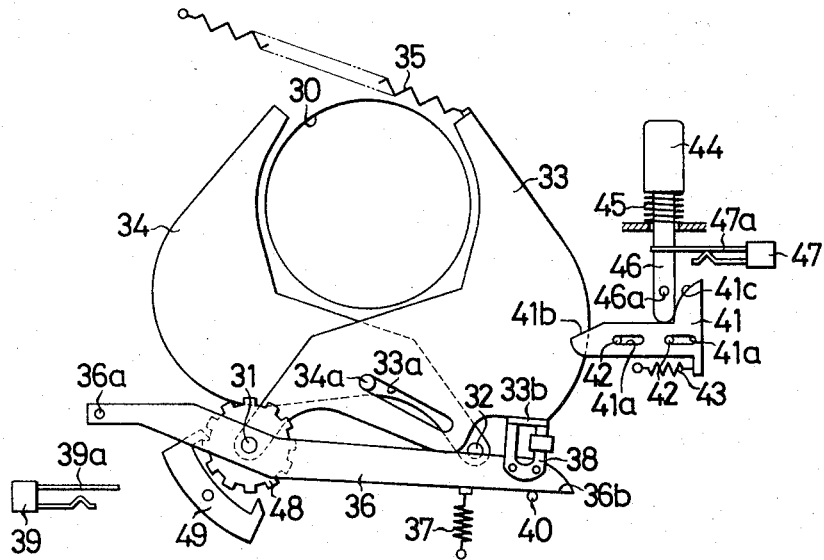
FIG. 6 is a view showing the same as the shutter is in full-open position.

FIGS. 5 and 6 show another embodiment in which the present invention is applied to a shutter apparatus which is operable as a so-called programmed shutter such that the shutter can be closed before it is fully opened out, both exposure time and diaphragm aperture size being controllable at the same time in accordance with the brightness of subject through the shutter sector opening and closing operation.

With reference to the drawings, indicated at 30 is a shutter opening. Right and left shutter sectors 33 and 34 are substantially symmetrically arranged and mounted on fixed pivots 31 and 32 disposed below the opening. The sector 33 is formed with a slot 33a, while the other sector 34 is provided with a pin 34a engaged in the slot 33a so that the sectors 33 and 34 are movable in opposite directions to each other in operatively associated fashion. The sector 33 of the pair has a shutter closing spring 35 acting thereon and biasing both the sectors 33 and 34 in directions to close the shutter.

A shutter operating member 36, pivotally supported by the fixed pivot 31, is biased in a clockwise direction (i.e., shutter opening direction) by a shutter opening spring 37 which is stronger than the shutter closing spring 35. Fixed to the front end of the member 36 is an electromagnet 38 whose attracting surface is mechanically brought into pressing contact with or proximity to an attractable piece 33b formed on the sector 33 when the shutter is in its cocked position. The member 36 has at its rear end a pin 36a which, when the shutter is in its cocked position, pushes the movable contact member 39a of a counting switch 39 to keep the switch closed. A stopper 40 is provided for the operating member 36 to retain the member 36 against clockwise movement at the position where the shutter is fully open.

A latch member 41, supported by guide pins 42 inserted in slots 41a thereof, is rendered movable rightward and leftward and is urged leftward by a spring 43, with a latch portion 41b at its front end positioned in the path of movement of the front end 36b of the operating member 36. When the shutter is in cocked position, the latch portion 41b engages the end 36b to latch the member 36 in its cocked position.

A shutter button 44 is urged upward by a spring 45 and connected to a release member 46 having a pin 46a, the spring 45 causing the pin to engage and push up the movable contact member 47a of a power source switch 47 for an exposure time control electric circuit. The switch is therefore open. The lower end of the release member 46 opposes a slanting cam surface 41c formed at an upper portion of the latch member 41, the arrangement being such that the shutter button 44, when depressed, first closes the power source switch 47 and then pushes the slanting cam surface, which in turn moves the latch member 41 rightward.

The shutter operating member 36 further fixedly carries an escape wheel 48 in meshing engagement with a pallet member 49 so as to slow down the pivotal movement of the operating member 36 by braking action.

The shutter button 44 is depressed when the shutter is in its cocked state as illustrated in FIG. 5. As already stated, this closes the power source switch 47 first to energize the electromagnet 38, which in turn holds the attractable piece 33b attracted thereto.

Further depression of the shutter button 44 causes the lower end of the release member 46 to push the slanting cam surface 41c of the latch member 41 and to move the member 41 rightward, whereby the shutter operating member 36 is unlatched. Consequently, the operating member 36 turns progressively in a clockwise direction under the action of the shutter opening spring 37 while being braked by the braking mechanism comprising the escape wheel 48 and the pallet member 49. By virtue of the attraction of the electromagnet 38, therefore, the member 36 pivotally moves the sectors 33 and 34 in opposite directions to each other, thereby progressively opening the shutter.

When the shutter operating member 36 starts to turn as above, the counting switch 39 immediately opens, initiating the exposure time control electric circuit into time measuring operation. Depending on the degree of opening of the sectors 33 and 34, namely, diaphragm aperture size and lapse of time after the initiation of the shutter opening movement, a proper exposure is given, whereupon the electric circuit turns off the current applied to the electromagnet 38.

The deenergization of the electromagnet 38 completes the opening movement of the sectors 33 and 34. Thus the sectors immediately quickly turn in closing directions under the action of the shutter closing spring 35 to finish the exposure making operation.

FIG. 6 shows the positions of the parts when the shutter is fully opened. With this type of shutter, however, the shutter closes when a proper amount of exposure has been given, before it is fully opened as already described. Thus the shutter operates as a so-called programmed shutter wherein the diaphragm aperture size and exposure time are determined in programmed manner in corresponding relation to the brightness of subject.

The embodiment of FIGS. 5 and 6 can be provided with indicating means as shown in FIGS. 1 to 4.

In each of the foregoing embodiments, the electromagnet and attractable piece may be disposed in reverse arrangement. Furthermore the attractable piece may alternatively be mounted on another separate member which is movable with the shutter sector. The shutter closing spring may be attached to the attractable piece.

What is claimed is:

1. An electronic shutter for a camera comprising:
   an electromagnet to be energized and deenergized under the control of an exposure time control electric circuit,
   an attractable piece attractable and holdable to the electromagnet with its magnetic force when the electromagnet is energized,
   a shutter sector movably supported by a fixed member away from a shutter opening and biased to close the shutter opening normally, the sector fixedly supporting one of the electromagnet and the attractable piece, and
   a shutter operating member movably supported by a fixed member away from the shutter opening and so biased as to be movable in a shutter opening direction upon shutter tripping action, the operating member being movable in a shutter closing direction by shutter cocking action and retainable in its cocked position, the operating member fixedly supporting the other of the electromagnet and the attractable piece to position the attracting surface of the electromagnet and the attractable piece in face-to-face contact with or in proximity to each other when in its cocked position, the operating member being movable to open the shutter upon shutter tripping action by accompanying the sector by means of the electromagnet and the attractable piece subject to energization of the electromagnet and to release the sector into shutter closing movement upon deenergization of the electromagnet.

2. The electronic shutter as set forth in claim 1 wherein the shutter sector and the shutter operating member are pivotally mounted on the same fixed member and biased in opposite directions to each other.

3. The electronic shutter as set forth in claim 1 wherein the attractable piece is formed integrally with the shutter sector.

4. The electronic shutter as set forth in claim 1 wherein the shutter sector comprises at least two blades associated with each other for synchronized movement and braking means acts on the shutter operating member to slow down the shutter opening movement thereof.

5. The electronic shutter as set forth in claim 1 further comprising:
   an opening bound preventing member engageable with the shutter operating member at the almost final stage of its shutter opening movement to brake the operating member to a stop, and
   a closing bound preventing member engageable with the shutter sector at the almost final stage of its shutter closing movement to brake the sector to a stop.

6. The electronic shutter as set forth in claim 1 further comprising:
   an opening bound preventing member engageable with the shutter operating member at the almost final stage of its movement in the shutter opening direction and biased to apply a braking force on the operating member against its rotational torque, the bound preventing member having an indicating portion for visibly indicating that the shutter has not been cocked and being movable with the operating member upon shutter cocking action to retract the indicating portion from a visible position, the bound preventing member further movable with the operating member upon shutter tripping action to advance the indicating portion to the visible position,
   a closing bound preventing member engageable with the shutter sector at the almost final stage of its shutter closing movement and biased to apply a braking force on the sector against its rotational torque, the closing bound preventing member having an indicating portion for visibly indicating that the shutter sector has been tripped upon shutter tripping action, the closing bound preventing member being movable to advance the indicating portion to a visible position when the shutter is opened and to retract the indicating portion from the visible position when the shutter is closed, and
   an alarm indicating member biased to move with the closing bound preventing member and having an indicating portion for visibly indicating that the shutter is inoperable due to the exhaustion of power source battery, the alarm indicating member being movable with the closing bound preventing member to bring the alarm indicating portion into and out of the path of movement of the opening bound preventing member, the alarm indicating member being movable with the opening bound preventing member to advance the alarm indicating portion to a visible position when it is detected that the shutter sector is inoperable upon shutter tripping action and to retract the alarm indicating portion from the visible position.

7. The electronic shutter as set forth in claim 6 wherein the indicating portions are movable into and out of the finder field of the camera.

* * * * *